US012789494B2

(12) United States Patent
Seguchi et al.

(10) Patent No.: US 12,789,494 B2
(45) Date of Patent: Nov. 10, 2026

(54) LABEL PRODUCTION METHOD AND LABEL

(71) Applicant: SEIKO EPSON CORPORATION, Tokyo (JP)

(72) Inventors: Kenichi Seguchi, Okaya (JP); Chigusa Sato, Matsumoto (JP); Emi Takeuchi, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 4 days.

(21) Appl. No.: 18/444,818

(22) Filed: Feb. 19, 2024

(65) Prior Publication Data

US 2024/0286371 A1 Aug. 29, 2024

(30) Foreign Application Priority Data

Feb. 20, 2023 (JP) ................................ 2023-024066

(51) Int. Cl.
*B31D 1/02* (2006.01)
*G09F 3/02* (2006.01)

(52) U.S. Cl.
CPC ............ *B31D 1/021* (2013.01); *B31D 1/026* (2013.01); *B31D 1/027* (2013.01); *G09F 3/02* (2013.01); *B31D 2201/02* (2013.01); *G09F 2003/0202* (2013.01); *G09F 2003/0225* (2013.01)

(58) Field of Classification Search
CPC ......... B31D 1/021; B31D 1/026; B31D 1/027
See application file for complete search history.

(56) References Cited

U.S. PATENT DOCUMENTS

| | | | | |
|---|---|---|---|---|
| 5,627,578 A * | 5/1997 | Weintraub | B41M 7/02 118/46 |
| 8,916,084 B2 * | 12/2014 | Chretien | C09D 11/34 264/494 |
| 10,113,088 B2 * | 10/2018 | Yamamuro | B31D 1/021 |
| 2007/0261784 A1 * | 11/2007 | Lawson | B31D 1/026 156/762 |
| 2013/0192112 A1 | 8/2013 | Yamamuro et al. | |
| 2019/0009491 A1 * | 1/2019 | Iwasawa | G09F 3/0292 |

FOREIGN PATENT DOCUMENTS

| | | | | |
|---|---|---|---|---|
| CN | 103201780 A | | 7/2013 | |
| CN | 110047375 B | * | 6/2022 | B41M 3/006 |
| DE | 102018220512 A1 | * | 5/2020 | C08F 220/1811 |
| EP | 2148311 A1 | * | 1/2010 | G09F 3/10 |
| JP | H06308886 A | * | 11/1994 | |

(Continued)

OTHER PUBLICATIONS

Machine translation DE102018220512A1 (Year: 2020).*

(Continued)

*Primary Examiner* — Jacob T Minskey
*Assistant Examiner* — Wayne K. Swier
(74) *Attorney, Agent, or Firm* — Harness, Dickey & Pierce, P.L.C.

(57) ABSTRACT

A label production method includes a label peeling portion forming step of attaching an active energy ray curable composition to a base material and curing the active energy ray curable composition to form a label peeling portion, in which the label peeling portion is formed 10 μm or more higher than surroundings in the label peeling portion forming step.

16 Claims, 6 Drawing Sheets

(56) References Cited

FOREIGN PATENT DOCUMENTS

| | | | | | | |
|---|---|---|---|---|---|---|
| JP | 2008225282 | A | * | 9/2008 | | |
| JP | 2009-067398 | A | | 4/2009 | | |
| JP | 2012171095 | A | * | 9/2012 | | |
| WO | WO-2015144757 | A1 | * | 10/2015 | ............... | G09F 3/10 |

OTHER PUBLICATIONS

Machine translation CN110047375B (Year: 2022).*
Machine translation JPH0638886A (Year: 1994).*
Machine translation JP2008225282A (Year: 2008).*
Machine translation JP2012171095A (Year: 2012).*

* cited by examiner

LABEL PRODUCTION METHOD AND LABEL

The present application is based on, and claims priority from JP Application Serial Number 2023-024066, filed Feb. 20, 2023, the disclosure of which is hereby incorporated by reference herein in its entirety.

BACKGROUND

1. Technical Field

The present disclosure relates to a label production method and a label.

2. Related Art

Generally, films for representing trade names and designs are wound around containers such as PET bottles, and various efforts are made on these films. For example, JP-A-2009-067398 discloses a container with a film, in which the film is wound around a container main body, and a film bonding portion protruding from a peripheral surface of the film is formed in the top-bottom direction of the container main body.

However, the container with a film described in JP-A-2009-067398 has had the following problem: the bonding portion rises from the peripheral surface of a shrink film, deteriorating visual quality. There has also been the following problem: when pinching the bonding portion and trying to peel the film, the bonding portion breaks during peeling the film, and the film cannot be completely peeled.

SUMMARY

A label production method of the present disclosure includes a label peeling portion forming step of attaching an active energy ray curable composition to a base material and curing the active energy ray curable composition to form a label peeling portion, in which the label peeling portion is formed 10 μm or more higher than surroundings in the label peeling portion forming step.

A label of the present disclosure has a base material and a label peeling portion formed on the base material, in which the label peeling portion is 10 μm or more higher than surroundings.

DESCRIPTION OF EMBODIMENTS

Figure 1A:
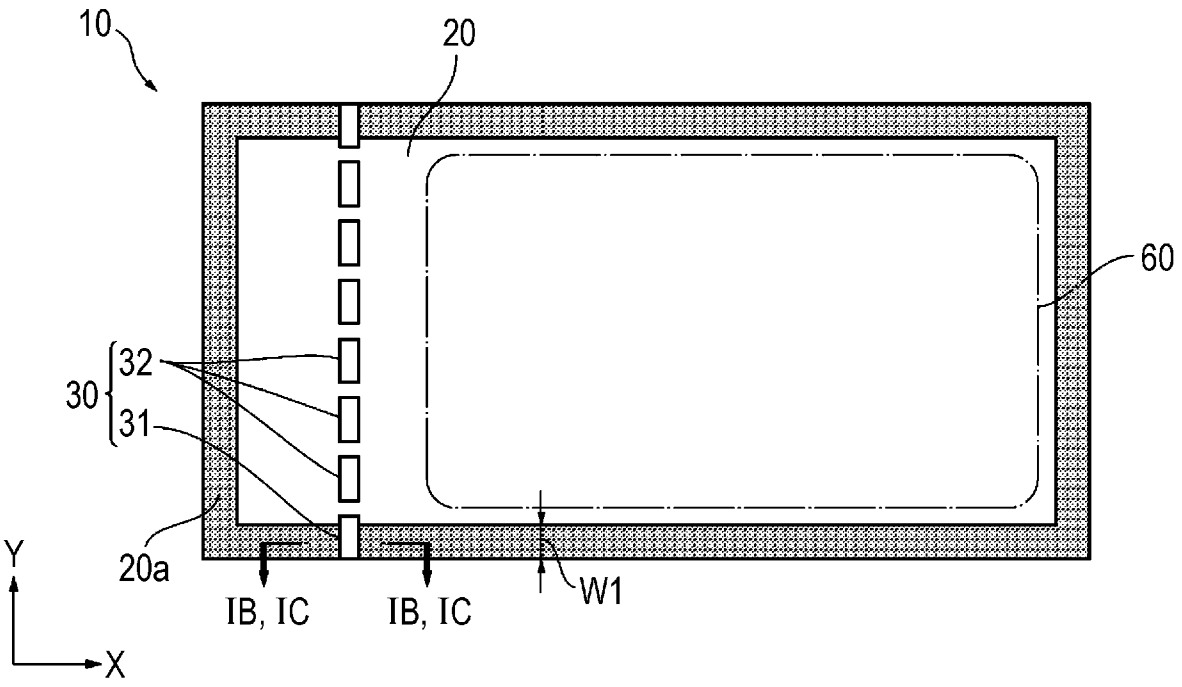
FIG. 1A is a plan view illustrating one aspect of a label according to an embodiment of the present disclosure.

Hereinafter, an embodiment of the present disclosure (hereinafter, referred to as the "present embodiment") will be described in detail while referring to drawings as necessary, but the present disclosure is not limited thereto, and various modifications are possible within a range not departing from the spirit thereof. Note that, in the drawings, identical elements are denoted by identical numerals, and cumulative description is omitted. Positional relationships such as top, bottom, left, and right are based on the positional relationships illustrated in the drawings unless otherwise stated. Furthermore, dimension ratios in the drawings are not limited to the ratios illustrated in the drawings.

1. Label Production Method

A label production method of the present embodiment includes a label peeling portion forming step of attaching an active energy ray curable composition to a base material 20 and curing the active energy ray curable composition to form a label peeling portion 30, in which the label peeling portion 30 is formed 10 μm or more higher than surroundings in the label peeling portion forming step.

In the present embodiment, the label peeling portion 30 is formed 10 μm or more higher than surroundings. The label peeling portion 30 thus forms a convex portion when a label 10 is wound around an object such as a PET bottle container. Therefore, adhesion between the front surface and the back surface of the wound label 10 is partly inhibited when the label 10 is wound around a product. Accordingly, the label peeling portion 30 is made easy to pinch with fingers, and the label 10 is made easy to peel as a result. However, factors making the label 10 easy to peel are not limited thereto.

FIG. 1A is a plan view illustrating one aspect of a label according to the present embodiment. The label 10 has the base material 20 and the label peeling portion 30 formed on the base material 20. The label peeling portion 30 may have a label peeling portion 31 formed on an edge portion 20*a* and a label peeling portion 32 formed on a portion other than the edge portion 20*a*. The edge portion 20*a* is an edge portion of the label 10, and the width W1 of the edge portion 20*a* may be 10 mm.

Figure 1B:
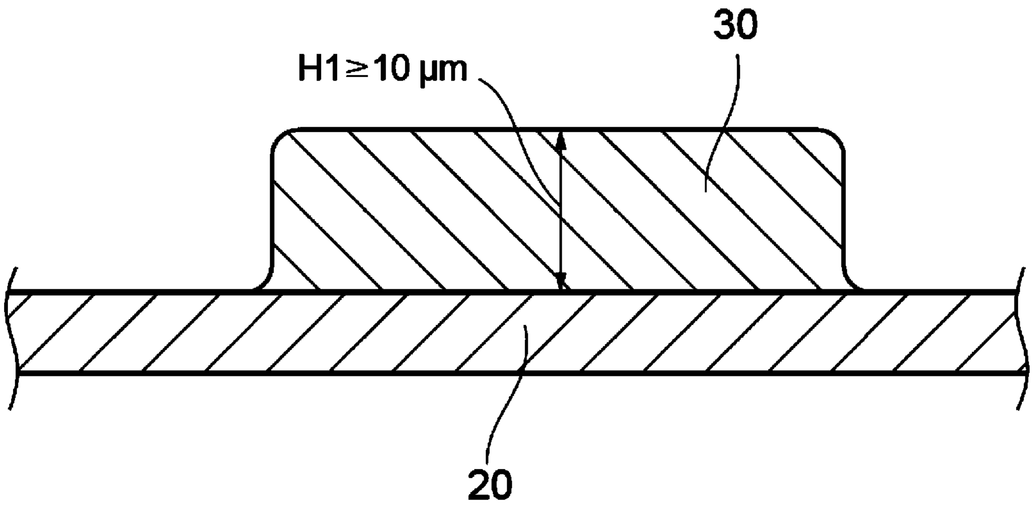
FIG. 1B is a cross-sectional view illustrating one aspect of a cross-section of the portion indicated by IB-IB in FIG. 1A.
Figure 1C:
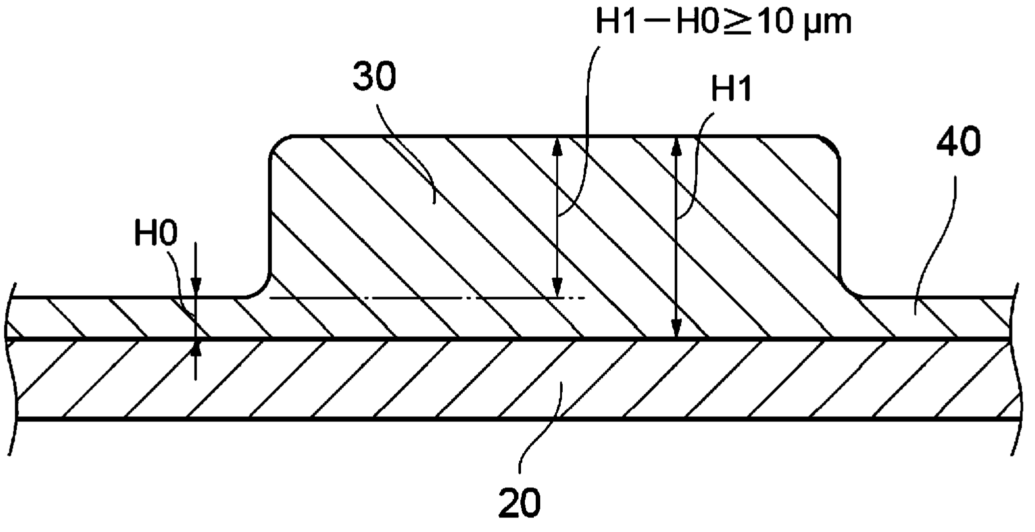
FIG. 1C is a cross-sectional view illustrating another aspect of the cross-section of the portion indicated by IC-IC in FIG. 1A.

FIG. 1B and FIG. 1C are cross-sectional views of cross-sections of the portion indicated by IB-IB and IC-IC in FIG. 1A, respectively. FIG. 1B illustrates an aspect in which the label peeling portion 30 is formed on a surface of the base material 20, and there is no optional layer 40 in an area around the label peeling portion 30. The phrase "the label peeling portion 30 is formed 10 μm or more higher than surroundings" in this aspect means that the distance H1 between the surface of the base material 20 and the upper surface of the label peeling portion 30 is 10 μm or more.

On the other hand, FIG. 1C illustrates an aspect in which an optional layer 40 and the label peeling portion 30 are formed on the surface of the base material 20, and the optional layer 40 is present in an area around the label peeling portion 30. The phrase "the label peeling portion 30 is formed 10 μm or more higher than surroundings" in this aspect means that the difference (H1−H0) between the distance H1 between the surface of the base material 20 and the upper surface of the label peeling portion 30 and the distance H0 between the surface of the base material 20 and the upper surface of the optional layer 40 is 10 μm or more.

The optional layer 40 may be an image layer or an underlayer of an image or may be a coating layer or the like. The area around the label peeling portion 30 is a region on the label 10 other than the label peeling portion 30 and may be preferably defined as a region within 10 mm from the edge of the label peeling portion 30 on the label 10 other than the label peeling portion 30.

Hereinafter, each step in the label production method of the present embodiment will be described in detail.

1.1 Label Peeling Portion Forming Step

The label peeling portion forming step is a step of attaching an active energy ray curable composition to a base material and curing the active energy ray curable composition to form a label peeling portion.

The planar shape of the label peeling portion 30 is not particularly limited but may be a rectangular shape as illustrated in FIG. 1A and the like, an elliptical shape, a square shape other than rectangular shapes, a triangle shape, or another polygonal shape. Figures represented by terms accompanied by the word “shape” may have rounded corners and may have curved sides. The same is true of terms accompanied by the word “shape” in the following.

When the planar shape of the label peeling portion 30 is a rectangular shape as illustrated in FIG. 1A and the like, the direction parallel to the long side is referred to as the X-axis direction, and the direction parallel to the short side is referred to as the Y-axis direction. In this case, the label may be attached to a side surface of a cylindrical product so that the X-axis direction and the circumferential direction of the cylindrical product become approximately parallel to each other.

Figure 2A:
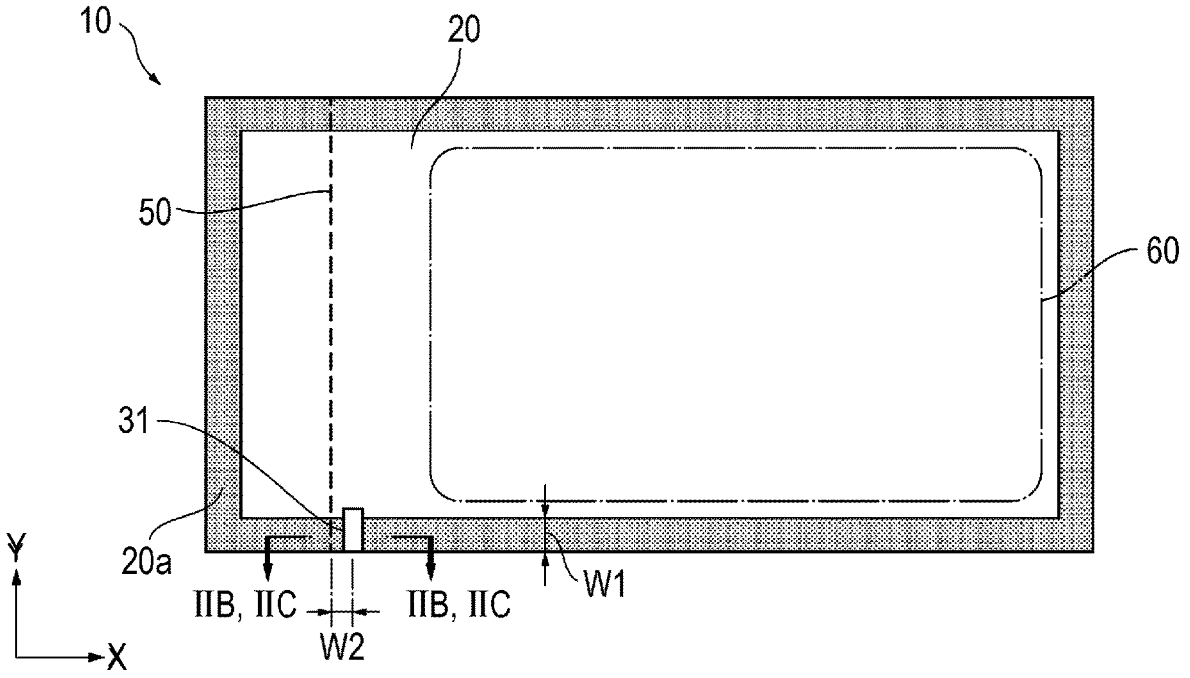
FIG. 2A is a plan view illustrating another aspect of the label according to the present embodiment.
Figure 3:
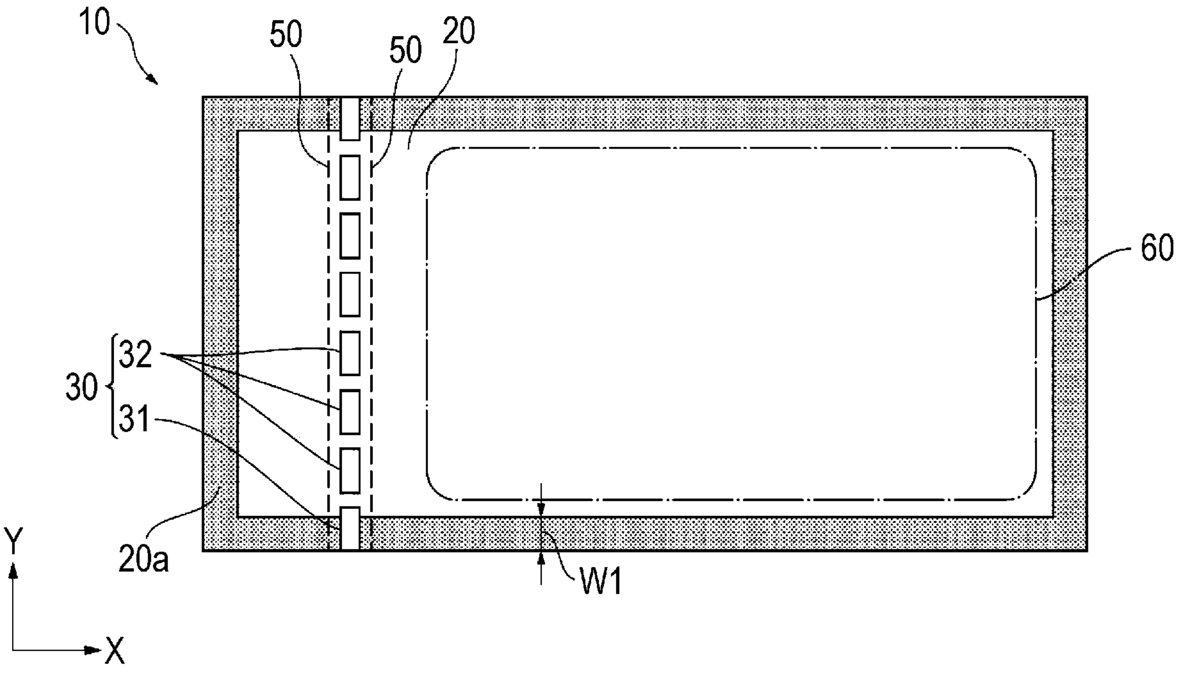
FIG. 3 is a plan view illustrating another aspect of the label according to the present embodiment.
Figure 4:
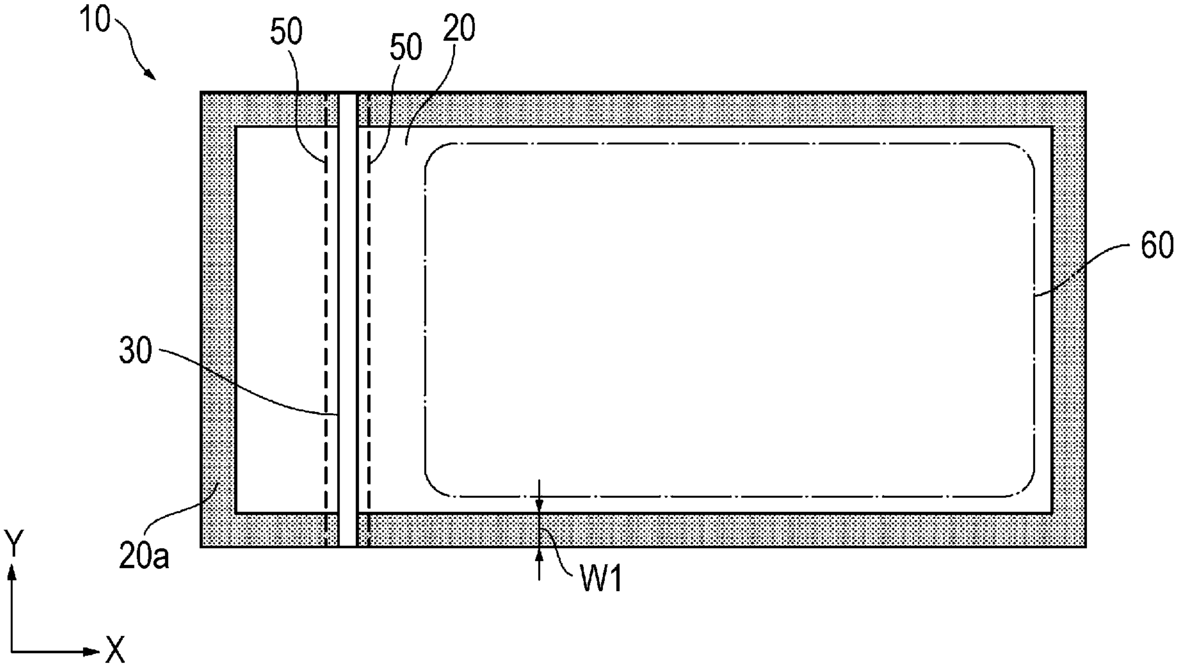
FIG. 4 is a plan view illustrating another aspect of the label according to the present embodiment.

The label peeling portion 30 may be formed into a dashed line shape in the Y-axis direction as illustrated in FIG. 1A and FIG. 3 and may be formed into a solid line shape in the Y-axis direction as illustrated in FIG. 4. In addition, besides such line shapes, the label peeling portion 30 may be partially formed in, for example, the edge portion 20*a* of the label 10 as illustrated in FIG. 2A.

Among them, the label peeling portion 30 is preferably located at least in the edge portion 20*a* of the label 10 as illustrated in FIG. 1A, FIG. 2A, FIG. 3, and FIG. 4 from the viewpoint of making the label easy to peel.

The length of one continuous piece of the label peeling portion 30 in the X-axis direction is not particularly limited but is preferably 1 to 20 mm, 2 to 15 mm, or 5 to 10 mm. In the case where the length of the label peeling portion 30 in the X-axis direction falls within the above ranges, the label peeling portion 30 forms a convex portion with an appropriate width when the label 10 is wound around an object such as a PET bottle container. Accordingly, the label peeling portion 30 is made easier to pinch with fingers, and the label tends to be made easy to peel as a result.

The phrase “one continuous piece of the label peeling portion 30” refers to each dash when the label peeling portion 30 has a dashed line shape as illustrated in FIG. 1A and FIG. 3 and refers to the whole solid line when the label peeling portion 30 has a solid line shape as illustrated in FIG. 4.

The length of one continuous piece of the label peeling portion 30 in the Y-axis direction is not particularly limited but is preferably 5% or more, 10% or more, 25% or more, 50% or more, or 100% based on the total length of the label in the Y-axis direction. When the length of the label peeling portion 30 in the Y-axis direction falls within the above ranges, ease of peeling tends to further increase.

FIG. 1B, FIG. 1C, FIG. 2B, and FIG. 2C illustrate cross-sectional views of the label peeling portion 30 in the X-axis direction. The cross-sectional shape of the label peeling portion 30 in the X-axis direction is not particularly limited but may be a trapezoidal shape, for example. The cross-sectional shape of the label peeling portion 30 in the X-axis direction is preferably a trapezoidal shape and more preferably a rectangular shape from the viewpoint that the label peeling portion 30 forms a convex portion when the label 10 is wound around an object such as a PET bottle container, making the label peeling portion 30 easier to pinch with fingers.

The height of the label peeling portion 30 relative to the surroundings is 10 μm or more and preferably 15 μm or more, 20 μm or more, or 25 μm or more. When the height of the label peeling portion 30 is 10 μm or more, ease of peeling further improves. In addition, the height of the label peeling portion 30 relative to the surroundings is preferably 100 μm or less, 90 μm or less, 80 μm or less, or 70 μm or less. When the height of the label peeling portion 30 is 100 μm or less, formation of the label peeling portion tends to be made easier.

Figure 2B:
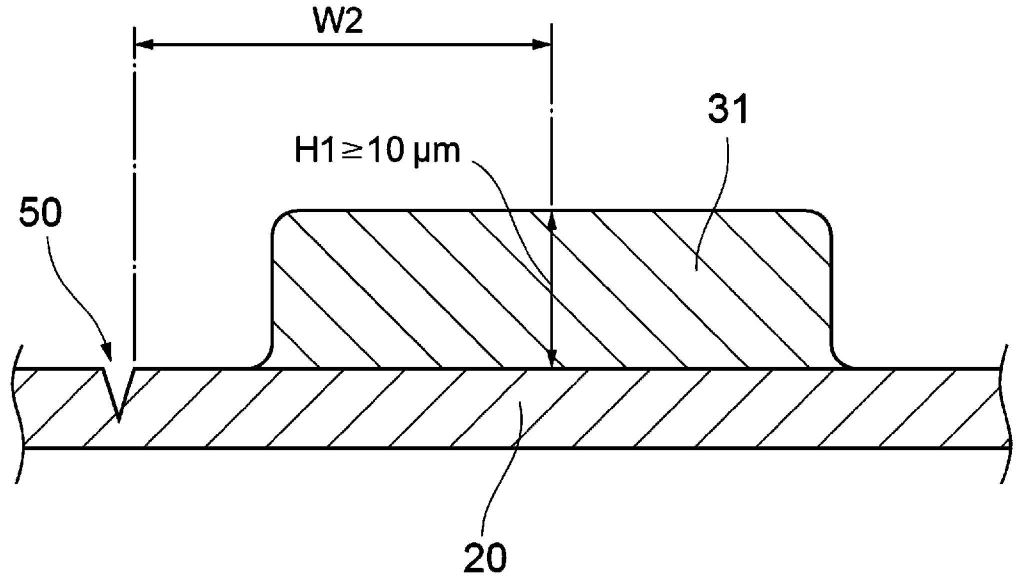
FIG. 2B is a cross-sectional view illustrating one aspect of a cross-section of the portion indicated by IIB-IIB in FIG. 2A.
Figure 2C:
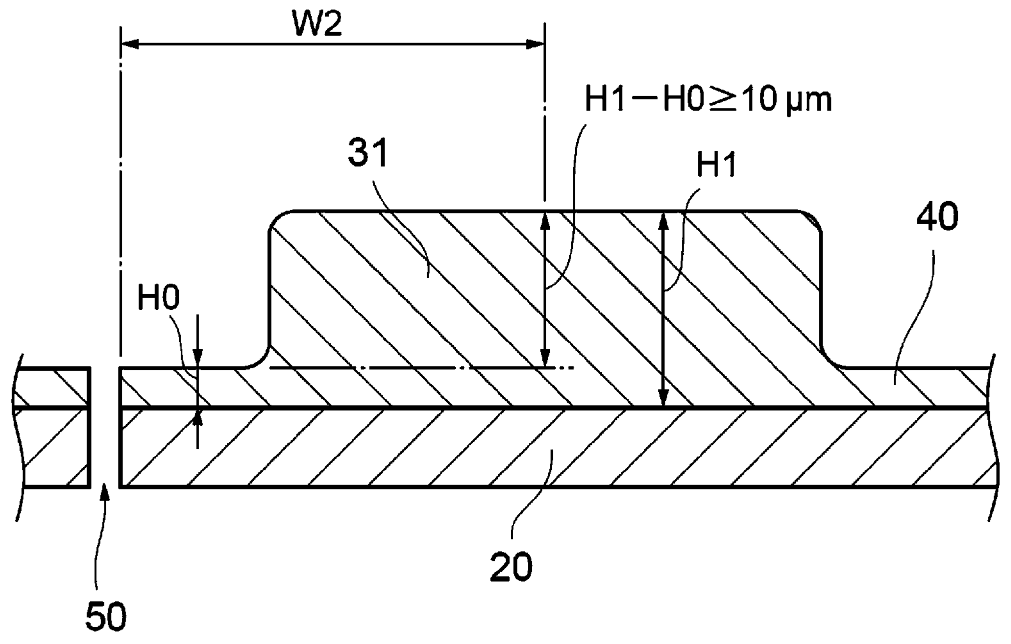
FIG. 2C is a cross-sectional view illustrating another aspect of the cross-section of the portion indicated by IIC-IIC in FIG. 2A.

The height of the label peeling portion 30 is H1 when the base material 20 is exposed as illustrated in FIG. 1B and FIG. 2B and is H1−H0 when the base material 20 is covered as illustrated in FIG. 1C and FIG. 2C.

The height of the label peeling portion 30 can be measured using, for example, a micrometer without particular limitation. Specifically, the height of the label peeling portion 30 can be measured in a method described later.

The label peeling portion 30 may have at least either the label peeling portion 31 formed on the edge portion 20*a* or the label peeling portion 32 formed on a portion other than the edge portion 20*a*. Among them, it is preferable that the label peeling portion 31 be formed at least in the edge portion 20*a* of the label 10 in the label peeling portion forming step. The label peeling portion 31 forms a convex portion in the edge portion 20*a* of the label thereby, and the label 10 thus tends to be made easy to peel from an edge thereof.

As an example of an aspect of formation of the label peeling portion 30, the label peeling portion 30 may be intermittently provided as multiple pieces in an in-line arrangement along the Y-axis direction as illustrated in FIG. 1A or as multiple pieces in a staggered arrangement, or may be provided continuously from one end to the other end of the label in an in-line arrangement along the Y-axis direction as illustrated in FIG. 4. Furthermore, while not shown in the drawings, the label peeling portion 30 may be provided as multiple columns parallel in the X-axis direction. In this case, each of the columns may have a dashed line shape or solid line shape extending in the Y-axis direction. Besides, the label peeling portion 30 may be arranged in the Y-axis direction instead of the X-axis direction and may be arranged in both of the X-axis direction and the Y-axis direction.

Among them, as illustrated in FIG. 4, the label peeling portion 30 is preferably provided continuously from one end to the other end of the label in an in-line arrangement along the Y-axis direction. Consequently, the adhesion between the front surface and the back surface of the wound label 10 is inhibited throughout the Y-axis direction, ease of peeling of the label 10 thus tends to further increase. In addition, since the label peeling portion 30 has strength stronger than that in a region around the label peeling portion 30, the label peeling portion 30 is made easy to cut without bending the label peeling portion 30 along the boundary between the label peeling portion 30 and the surroundings thereof. When the label peeling portion 30 is provided continuously from one end to the other end of the label in an in-line arrangement along the Y-axis direction, the label 10 is made easier to peel than the case where multiple pieces of the label peeling portion 30 are intermittently provided in an in-line arrangement along the Y-axis direction, strength of the label peeling portion 30 further increases, and the label peeling portion 30 is made easy to cut without bending the label peeling portion 30 along the boundary between the label peeling portion 30 and the surroundings thereof.

Although the method for attaching the active energy ray curable composition to the base material 20 is not particularly limited, examples thereof include an application method of applying the active energy ray curable composition to the base material 20, and an ink jet method of discharging the active energy ray curable composition from an ink jet head to attach same to the base material 20. Among them, the ink jet method is preferable. Consequently, the position at which the label peeling portion 30 is formed and the height of the label peeling portion 30 are easily adjusted.

Specifically, a pressure generation means provided inside the ink jet head is driven to discharge, from a nozzle, an ink composition filling the inside of a pressure generation chamber of the ink jet head, in the ink jet method.

Examples of the ink jet head include a line head for recording with a line method, and a serial head for recording with a serial method.

In the line method using the line head, for example, an ink jet head having a width equal to or wider than the recording width of the base material 20 is fixed to a recording device. Then, the base material 20 is moved along the vertical scanning direction (transporting direction of the base material 20), and the active energy ray curable composition is attached onto the base material 20 by discharging ink droplets from the nozzle of the ink jet head in conjunction with the movement of the base material 20.

In the serial method using the serial head, for example, the ink jet head is mounted on a carriage capable of moving in the width direction of the base material 20. Then, the carriage is moved along the main scanning direction (width direction of the base material 20), and the active energy ray curable composition is attached onto the base material 20 by discharging ink droplets from the nozzle of the ink jet head in conjunction with the movement of the carriage.

The method for curing the active energy ray curable composition is not particularly limited but is, for example, a curing method utilizing irradiation with active energy rays. Examples of the active energy rays include ultraviolet rays, X rays, gamma rays, and electron beams, but are not limited thereto. The active energy rays are preferably ultraviolet rays from the viewpoint that an ultraviolet source is easily available and widely used and from the viewpoint that a material suitable for curing with ultraviolet irradiation is easily available and widely used.

Although the ultraviolet source is not particularly limited, examples thereof include a mercury lamp, a high-pressure mercury lamp, a UV-LED, a xenon lamp, and a laser light source.

Irradiation energy in a single dose of irradiation to the active energy ray curable composition is not particularly limited but is preferably 50 to 1000 $J/cm^2$, 50 to 500 $J/cm^2$, 100 to 300 $J/cm^2$, or 150 to 300 $J/cm^2$. A single dose of irradiation is carried out through scanning once. When the irradiation energy in a single dose of irradiation falls within the above ranges, curing performance of the active energy ray curable composition tends to improve.

Intensity of irradiation to the active energy ray curable composition is not particularly limited but is preferably 1 to 12 $mW/cm^2$, 3 to 8 $mW/cm^2$, or 4 to 7 $mW/cm^2$. When the irradiation intensity falls within the above ranges, curing performance of the active energy ray curable composition tends to improve.

1.2. Cutting Portion Forming Step

The label production method according to the present embodiment may include a cutting portion forming step of forming, in the base material 20, a cutting portion 50 for cutting the label. By virtue of forming the cutting portion 50, the label 10 is made easy to cut, with the cutting portion 50 as a trigger, when the label 10 is wound around an object such as a PET bottle container. The label 10 tends to be made easy to peel, as a result.

The cutting portion 50 may be a perforated line in which through-holes are intermittently formed in a certain direction or may be an incision formed in an edge portion, for example, but is not limited thereto. The cutting portion 50 may also be multiple perforated lines. In this case, adjacent perforated lines may be disposed in a staggered arrangement. Furthermore, the cutting portion 50 does not necessarily penetrate the base material 20 as in the cases of a through hole, an incision, etc., and may be formed by, for example, half-cutting the base material 20.

In the cutting portion forming step, the cutting portion 50 is preferably formed at least in the edge portion 20*a* of the label 10, and the cutting portion 50 is preferably formed in a side edge of the label 10. Consequently, the label 10 is made easy to cut in the edge portion 20*a* of the label from the edge thereof, with the cutting portion 50 as a trigger, and the label 10 tends to be made easy to peel, as a result.

The length of the cutting portion 50 in the Y-axis direction is not particularly limited but is preferably 0.1% or more, 1.0% or more, 5.0% or more, 10.0% or more, or 25.0% or more of the length of the label in the Y-axis direction. When the length of the cutting portion 50 in the Y-axis direction falls within the above ranges, the label tends to be made easy to peel when the label 10 is wound around an object such as a PET bottle container.

The cutting portion 50 may be intermittently provided in an in-line arrangement along the Y-axis direction as illustrated in FIG. 2A, may be intermittently provided as multiple columns in an in-line arrangement along the Y-axis direction as illustrated in FIG. 3 and FIG. 4, or may be provided partially in the edge portion 20*a* or the like while not shown in the drawings. Consequently, the label 10 is made easy to cut, and the label 10 tends to be made easy to peel, as a result.

When the cutting portion 50 is intermittently provided as multiple pieces in an in-line arrangement along the Y-axis direction, it is preferable that at least one piece of the cutting portion 50 be present in the edge portion 20*a* or be partially present in the edge portion 20*a*. When at least one piece of the cutting portion 50 is present in the edge portion 20*a* or is partially present in the edge portion 20*a*, the label 10 is made easier to cut, and the label 10 tends to be made easy to peel, as a result, when the label 10 is wound around an object such as a PET bottle container.

Although the cutting portion 50 can be formed in an arbitrary position on the label 10, it is preferable that the cutting portion 50 be formed adjacently to the label peeling portion 30. When the cutting portion 50 is formed adjacently to the label peeling portion 30, an effect of ease of peeling the label 10 resulting from the presence of the label peeling portion 30 and an effect of ease of peeling the label 10 resulting from the presence of the cutting portion 50 are both provided, making the label 10 easier to peel.

The meaning of the term "adjacently" herein is not particularly limited, but the term "adjacently" indicates that the distance W2 between the cutting portion 50 and the label peeling portion 30 illustrated in FIG. 2A is 15 mm or less, 10 mm or less, 5 mm or less, or 1 mm or less, for example.

More specifically, the distance W2 between the cutting portion 50 and the label peeling portion 30 refers to a distance in the X-axis direction from the end of the cutting portion 50 on the label peeling portion 30 side in the X-axis direction to the center of the label peeling portion 30 as illustrated in FIG. 2B and FIG. 2C.

Multiple cutting portions 50 may be present in the X-axis direction of the label 10. In this case, as illustrated in FIG. 3, at least two cutting portions 50 are preferably provided adjacently to the label peeling portion 30, with the label peeling portion 30 interposed therebetween. In the case where the cutting portions 50 are present as described above, the label 10 tends to be made easy to peel when the label 10 is wound around an object such as a PET bottle container.

Various known methods can be used to provide the cutting portion 50. For example, a cutting portion may be provided using a machine, or a perforated line and/or an incision may be manually provided. Specifically, the cutting portion 50 is provided in a method described later, for example.

1.3. Image Forming Step

The label production method according to the present embodiment may further include an image forming step of attaching, onto the base material 20, an active energy ray curable composition for an image described later, and curing the active energy ray curable composition for an image to form a display image 60.

Although the method for attaching the active energy ray curable composition for an image is not particularly limited, examples thereof include an ink jet method in which the active energy ray curable composition is discharged from an ink jet head to attach same onto the base material 20.

An ink jet method may be used for both the label peeling portion forming step and the image forming step. Consequently, the label peeling portion and the display image can be simultaneously formed by attaching the active energy ray curable composition and the active energy ray curable composition for an image onto the base material 20, which is preferable.

The display image 60 may be present on part of the label 10 as illustrated in FIG. 1A and the like or may be present on the entire of the label 10.

1.4. Cutting Out Step

The label production method according to the present embodiment may further include a cutting out step of cutting out the label 10 from the base material 20. In this case, the edge portion 20*a* may be or may not be an edge portion of the base material 20.

The label 10 can be effectively produced on a large-scale by providing multiple pieces of the label peeling portion 30 at once on the long base material 20, providing, if needed, the cutting portion 50 and the display image 60 at once, and subsequently carrying out the cutting out step to produce the label 10.

The label peeling portion forming step, the cutting portion forming step, the image forming step, and the cutting out step may be carried out in an arbitrary order. In addition, the cutting portion forming step may be carried out during producing the label or may be carried out after producing the label and then winding the label around an object such as a PET bottle container.

2. Active Energy Ray Curable Composition

The active energy ray curable composition according to the present embodiment includes a polymerizable compound and may include a filler and/or an inorganic pigment. The polymerizable compound may include a monofunctional monomer and a polyfunctional polymer. The active energy ray curable composition herein is a composition cured through irradiation with active energy rays. When the label peeling portion 30 is formed using the active energy ray curable composition, the label peeling portion 30 tends to be thick and hard, the label peeling portion 30 is made easy to pinch with fingers when the label 10 is wound around an object such as a PET bottle container, and the label peeling portion 30 is made less likely to break during peeling the label, and the label 10 tends to be made easy to peel as a result.

Examples of the active energy rays include ultraviolet rays, X rays, gamma rays, and electron beams, but are not limited thereto. The active energy rays are preferably ultraviolet rays from the viewpoint that an ultraviolet source is easily available and widely used and from the viewpoint that a material suitable for curing with ultraviolet radiation is easily available and widely used.

Although the ultraviolet source is not particularly limited, examples thereof include a mercury lamp, a high-pressure mercury lamp, a UV-LED, a xenon lamp, and a laser light source.

Hereinafter, the active energy ray curable composition according to the present embodiment will be described in detail.

2.1. Polymerizable Compound

The polymerizable compound may include a monofunctional monomer having one polymerizable functional group and a polyfunctional monomer having multiple polymerizable functional groups. One kind of the polymerizable compound may be used alone, or two or more kinds thereof may be used in combination.

2.1.1. Monofunctional Monomer

Although the monofunctional monomer of the present embodiment is not particularly limited, examples thereof include a nitrogen-containing monofunctional monomer, a monofunctional acrylate having a polycyclic hydrocarbon group, and an aromatic group-containing monofunctional monomer. One kind of the monofunctional monomer may be used alone, or two or more kinds thereof may be used in combination.

The content of the monofunctional monomer is preferably 40% by mass or less, 5% to 40% by mass, 10% to 40% by mass, or 20% to 40% by mass based on the total amount of the polymerizable compound. Furthermore, the content of the monofunctional monomer based on the total amount of the polymerizable compound is 30% to 40% by mass. When the content of the monofunctional monomer falls within the above ranges, hardness of the label peeling portion 30 increases, and the label peeling portion 30 that stands out as the convex portion is made easier to pinch with fingers when the label 10 is wound around an object such as a PET bottle container; furthermore, the label peeling portion 30 is made less likely to break during peeling the label, and the label tends to be made easy to peel as a result.

The content of the monofunctional monomer is preferably 40% by mass or less, 5% to 35% by mass, or 10% to 30% by mass based on the total amount of the active energy ray curable composition. Furthermore, the content of the monofunctional monomer based on the total amount of the active energy ray curable composition is 20% to 30% by mass. When the content of the monofunctional monomer falls within the above ranges, hardness of the label peeling portion 30 increases, and the label peeling portion 30 that stands out as the convex portion is made easier to pinch with fingers when the label 10 is wound around an object such as a PET bottle container; furthermore, the label peeling portion 30 is made less likely to break during peeling the label, and the label tends to be made easy to peel as a result.

2.1.1.1. Nitrogen-Containing Monofunctional Monomer

Although the nitrogen-containing monofunctional monomer is not particularly limited, examples thereof include nitrogen-containing monofunctional vinyl monomers such as N-vinylcaprolactam, N-vinylformamide, N-vinylcarbazole, N-vinylacetamide, and N-vinylpyrrolidone; nitrogen-containing monofunctional (meth)acrylate monomers such as acryloylmorpholine; and nitrogen-containing monofunctional acrylamide monomers including (meth)acrylamides such as (meth)acrylamide, N-hydroxymethyl (meth)acrylamide, diacetone acrylamide, N,N-dimethyl(meth)acrylamide, and a quaternary salt of dimethylaminoethyl acrylate benzyl chloride. Among them, the nitrogen-containing monofunctional monomer preferably includes either a nitrogen-containing monofunctional vinyl monomer or a nitrogen-containing monofunctional meth(acrylate) monomer, is more preferably a monomer having a nitrogen-containing heteroring structure such as N-vinylcaprolactam, N-vinylcarbazole, N-vinylpyrrolidone, or acryloylmorpholine, and further preferably includes acryloylmorpholine.

When such a nitrogen-containing monofunctional monomer is used, hardness of the label peeling portion 30 increases, and the label peeling portion 30 that stands out as the convex portion is made easier to pinch with fingers when the label 10 is wound around an object such as a PET bottle container; furthermore, the label peeling portion 30 is made less likely to break during peeling the label, and the label tends to be made easy to peel as a result.

The content of the nitrogen-containing monofunctional monomer is preferably 3% to 25% by mass, 3% to 20% by mass, 3% to 15% by mass, 3% to 10% by mass, or 3% to 8% by mass based on the total amount of the polymerizable compound. Alternatively, the above ranges may be applied to the content of the nitrogen-containing monofunctional monomer based on the total amount of the active energy ray curable composition. When the content of the nitrogen-containing monofunctional monomer falls within the above ranges, hardness of the label peeling portion 30 increases, and the label peeling portion 30 that stands out as the convex portion is made easier to pinch with fingers when the label 10 is wound around an object such as a PET bottle container; furthermore, the label peeling portion 30 is made less likely to break during peeling the label, and the label tends to be made easy to peel as a result.

2.1.1.2. Monofunctional (Meth)acrylate Having Polycyclic Hydrocarbon Group

Although the monofunctional (meth)acrylate having a polycyclic hydrocarbon group is not particularly limited, examples thereof include acrylates having an unsaturated polycyclic hydrocarbon group such as dicyclopentenyl acrylate and dicyclopentenyloxyethyl acrylate; and acrylates having a saturated polycyclic hydrocarbon group such as dicyclopentanyl acrylate and isobornyl acrylate. Among them, acrylates having a saturated polycyclic hydrocarbon group such as dicyclopentanyl acrylate and isobornyl acrylate are preferable, and isobornyl acrylate is preferably included.

When such a monofunctional (meth)acrylate having a polycyclic hydrocarbon group is used, hardness of the label peeling portion 30 increases, and the label peeling portion 30 that stands out as the convex portion is made easier to pinch with fingers when the label 10 is wound around an object such as a PET bottle container; furthermore, the label peeling portion 30 is made less likely to break during peeling the label, and the label tends to be made easy to peel as a result.

The content of the monofunctional (meth)acrylate having a polycyclic hydrocarbon group is preferably 3% to 21% by mass, 3% to 16% by mass, 3% to 11% by mass, or 3% to 6% by mass based on the total amount of the polymerizable compound. The above ranges may be applied to the content of the monofunctional (meth)acrylate having a polycyclic hydrocarbon group based on the total amount of the active energy ray curable composition.

When the content of the monofunctional (meth)acrylate having a polycyclic hydrocarbon group falls within the above ranges, hardness of the label peeling portion 30 increases, and the label peeling portion 30 that stands out as the convex portion is made easier to pinch with fingers when the label 10 is wound around an object such as a PET bottle container; furthermore, the label peeling portion 30 is made less likely to break during peeling the label, and the label tends to be made easy to peel as a result.

Incidentally, the monofunctional (meth)acrylate having a polycyclic hydrocarbon group described above may be substituted with a monofunctional (meth)acrylate having an alicyclic structure. The monofunctional (meth)acrylate having an alicyclic structure includes the above-described monofunctional (meth)acrylate having a polycyclic hydrocarbon group and a monofunctional (meth)acrylate having a monocyclic hydrocarbon group. Examples of the monofunctional (meth)acrylate having a monocyclic hydrocarbon group include cyclohexyl (meth)acrylate.

2.1.1.3. Aromatic Group-Containing Monofunctional Monomer

Although the aromatic group-containing monofunctional monomer is not particularly limited, examples thereof include phenoxyethyl (meth)acrylate, benzyl (meth)acrylate, alkoxylated 2-phenoxyethyl (meth)acrylate, ethoxylated nonylphenyl (meth)acrylate, alkoxylated nonylphenyl (meth)acrylate, p-cumylphenol EO-modified (meth)acrylate, and 2-hydroxy-3-phenoxypropyl (meth)acrylate. Among them, phenoxyethyl (meth)acrylate and benzyl (meth)acrylate are preferable, phenoxyethyl (meth)acrylate is more preferable, and phenoxyethyl acrylate (PEA) is further preferable. (Meth)acrylates are preferable.

When such an aromatic group-containing monofunctional monomer is used, hardness of the label peeling portion 30 increases, and the label peeling portion 30 that stands out as the convex portion is made easier to pinch with fingers when the label 10 is wound around an object such as a PET bottle container; furthermore, the label peeling portion 30 is made less likely to break during peeling the label, and the label tends to be made easy to peel as a result.

The content of the aromatic group-containing monofunctional monomer is preferably 15% to 30% by mass, or 20% to 25% by mass based on the total amount of the polymerizable compound. The above ranges may be applied to the content of the aromatic group-containing monofunctional monomer based on the total amount of the active energy ray curable composition. When the content of the aromatic group-containing monofunctional monomer falls within the above ranges, hardness of the label peeling portion 30 increases, and the label peeling portion 30 that stands out as the convex portion is made easier to pinch with fingers when the label 10 is wound around an object such as a PET bottle container; furthermore, the label peeling portion 30 is made less likely to break during peeling the label, and the label tends to be made easy to peel as a result.

2.1.2. Polyfunctional Monomer

Although the polyfunctional monomer of the present embodiment is not particularly limited, examples thereof include a vinyl ether group-containing (meth)acrylate and a bifunctional (meth)acrylate.

The content of the polyfunctional monomer is preferably 60% by mass or more, 60% to 95% by mass, 60% to 90% by mass, or 60% to 80% by mass based on the total amount of the polymerizable compound. When the content of the polyfunctional monomer falls within the above ranges, hardness of the label peeling portion 30 increases, and the label peeling portion 30 that stands out as the convex portion is made easier to pinch with fingers when the label 10 is wound around an object such as a PET bottle container; furthermore, the label peeling portion 30 is made less likely to break during peeling the label, and the label tends to be made easy to peel as a result.

The content of the polyfunctional monomer is preferably 45% to 90% by mass, 50% to 85% by mass, or 55% to 80% by mass based on the total amount of the active energy ray curable composition. When the content of the polyfunctional monomer falls within the above ranges, hardness of the label peeling portion 30 increases, and the label peeling portion 30 that stands out as the convex portion is made easier to pinch with fingers when the label 10 is wound around an object such as a PET bottle container; furthermore, the label peeling portion 30 is made less likely to break during peeling the label, and the label tends to be made easy to peel as a result.

2.1.2.1. Vinyl Ether Group-Containing (Meth)acrylate

Although the vinyl ether group-containing (meth)acrylate is not particularly limited, examples thereof include a compound represented by formula (1) below. When such a vinyl ether group-containing (meth)acrylate is included, viscosity of the composition tends to decrease, and discharging stability tends to be further improved. In addition, curability of the composition is further improved, and it is possible to further increase recording speed as curability increases.

$$CH_2{=}CR^1{-}COOR^2{-}O{-}CH{=}CH{-}R^3 \qquad (1)$$

(In the formula, $R^1$ is a hydrogen atom or a methyl group; $R^2$ is a divalent organic residue having 2 to 20 carbon atoms; and $R^3$ is a hydrogen atom or a monovalent organic residue having 1 to 11 carbon atoms.)

In formula (1) above, the divalent organic residue represented by $R^2$ and having 2 to 20 carbon atoms includes a linear, branched, or cyclic alkylene group having 2 to 20 carbon atoms, which may have a substituent; an alkylene group having, in the structure thereof, an oxygen atom forming an ether bond and/or an ester bond and having 2 to 20 carbon atoms, which may have a substituent; and a divalent aromatic group having 6 to 11 carbon atoms, which may have a substituent. Among them, alkylene groups having 2 to 6 carbon atoms such as an ethylene group, a n-propylene group, an isopropylene group, and a butylene group; and an alkylene groups having, in the structure thereof, an oxygen atom forming an ether bond and having 2 to 9 carbon atoms such as an oxyethylene group, an oxy-n-propylene group, an oxy isopropylene group, and an oxybutylene group are preferable. Furthermore, from the viewpoints of further decreasing the viscosity of the composition and further improving curability of the composition, $R^2$ is more preferably a compound having a glycol ether chain, which is an alkylene group having, in the structure thereof, an oxygen atom forming an ether bond and having 2 to 9 carbon atoms, such as an oxyethylene group, an oxy-n-propylene group, an oxy isopropylene group, and an oxybutylene group.

In formula (1) above, the monovalent organic residue represented by $R^3$ and having 1 to 11 carbon atoms is preferably a linear, branched, or cyclic alkyl group having 1 to 10 carbon atoms, which may have a substituent, or an aromatic group having 6 to 11 carbon atoms, which may have a substituent. Among them, an alkyl group having 1 or 2 carbon atoms, a methyl group or an ethyl group, and an aromatic group having 6 to 8 carbon atoms such as a phenyl group and a benzyl group are preferably used.

When each of the organic residues described above is a group which may have a substituent, substituents thereof are divided into groups including a carbon atom and groups including no carbon atom. When the substituent is a group including a carbon atom, the carbon atom is counted as the number of carbon atoms in the organic residue. Examples of the group including a carbon atom include a carboxy group and an alkoxy group but are not limited thereto. Examples of the group having no carbon atom include a hydroxy group and a halo group but are not limited thereto.

Specific examples of the compound of formula (1) include 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(2-vinyloxyethoxy)ethyl methacrylate, 2-(2-vinyloxyethoxy)ethyl acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth)acrylate, polyethylene glycol monovinyl ether (meth)acrylate, and polypropylene glycol monovinyl ether (meth)

acrylate. Among these specific examples, 2-(2-vinyloxyethoxy)ethyl acrylate is especially preferable from the point of balancing curability and viscosity of the composition. Incidentally, in the present embodiment, 2-(2-vinyloxyethoxy)ethyl acrylate is sometimes referred to as VEEA.

The content of the vinyl ether group-containing (meth)acrylate is preferably 20% to 50% by mass, 30% to 50% by mass, or 33% to 50% by mass based on the total amount of the polymerizable compound. When the content of the vinyl ether group-containing (meth)acrylate falls within the above ranges, hardness of the label peeling portion 30 increases, and the label peeling portion 30 that stands out as the convex portion is made easier to pinch with fingers when the label 10 is wound around an object such as a PET bottle container; furthermore, the label peeling portion 30 is made less likely to break during peeling the label, and the label tends to be made easy to peel as a result.

2.1.2.2. Bifunctional (Meth)acrylate

Although the bifunctional (meth)acrylate is not particularly limited, examples thereof include dipropylene glycol diacrylate (DPGDA), diethylene glycol di(meth)acrylate, triethylene glycol di(meth)acrylate, tetraethylene glycol di(meth)acrylate, polyethylene glycol di(meth)acrylate, dipropylene glycol dimethacrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, di(meth)acrylate of an EO (ethylene oxide) adduct of bisphenol A, di(meth)acrylate of a PO (propylene oxide) adduct of bisphenol A, neopentyl glycol hydroxypivalate di(meth)acrylate, and polytetramethylene glycol di(meth)acrylate.

The content of the bifunctional (meth)acrylate is preferably 15% to 50% by mass, 20% to 45% by mass, or 25% to 40% by mass based on the total amount of the polymerizable compound. When the content of the bifunctional (meth)acrylate falls within the above ranges, hardness of the label peeling portion 30 increases, and the label peeling portion 30 that stands out as the convex portion is made easier to pinch with fingers when the label 10 is wound around an object such as a PET bottle container; furthermore, the label peeling portion 30 is made less likely to break during peeling the label, and the label tends to be made easy to peel as a result.

2.2. Polymerization Initiator

The active energy ray curable composition according to the present embodiment preferably contains a polymerization initiator generating an active species through irradiation with active energy rays. One kind of the polymerization initiator may be used alone, or two or more kinds thereof may be used in combination.

Although the polymerization initiator is not particularly limited, examples thereof include known polymerization initiators such as an acylphosphineoxide-based polymerization initiator, an alkylphenone-based polymerization initiator, a titanocene-based polymerization initiator, and a thioxanthone-based polymerization initiator. Among them, the acylphosphineoxide-based polymerization initiator is preferable. When such a polymerization initiator is used, hardness of the label peeling portion 30 increases, and the label peeling portion 30 that stands out as the convex portion is made easier to pinch with fingers when the label 10 is wound around an object such as a PET bottle container; furthermore, the label peeling portion 30 is made less likely to break during peeling the label, and the label tends to be made easy to peel as a result. In addition, curing speed of the active energy ray curable composition tends to increase.

Although the acylphosphineoxide-based polymerization initiator is not particularly limited, examples thereof include 2,4,6-trimethylbenzoyl diphenylpohosphine oxide, bis(2,4,6-trimethylbenzoyl)-phenylpohosphine oxide, and bis-(2,6-dimethoxybenzoyl)-2,4,4-trimethylpentylpohosphine oxide.

A sensitizer such as 2,4-diethyl thioxanthone may be used in combination with the polymerization initiator described above.

The content of the polymerization initiator is preferably 5% to 20% by mass, 7.5% to 17.5% by mass, or 10% to 15% by mass based on the total amount of the active energy ray curable composition. When the content of the polymerization initiator falls within the above ranges, hardness of the label peeling portion 30 increases, and the label peeling portion 30 that stands out as the convex portion is made easier to pinch with fingers when the label 10 is wound around an object such as a PET bottle container; furthermore, the label peeling portion 30 is made less likely to break during peeling the label, and the label tends to be made easy to peel as a result.

2.3. Polymerization Inhibitor

The active energy ray curable composition according to the present embodiment may include a polymerization inhibitor. One kind of the polymerization inhibitor may be used alone, or two or more kinds thereof may be used in combination.

Although the polymerization inhibitor is not particularly limited, examples thereof include phenol-based polymerization inhibitors such as p-methoxyphenol, cresol, t-butyl catechol, 3,5-di-t-butyl-4-hydroxytoluene, 2,2'-methylenebis(4-methyl-6-t-butylphenol), 2,2'-methylenebis(4-ethyl-6-butylphenol), and 4,4'-thiobis(3-methyl-6-t-butylphenol) as well as hindered amine, hydroquinone monomethyl ether (MEHQ), and hydroquinone.

The content of the polymerization inhibitor is preferably 0.1% to 1.0% by mass or 0.1% to 0.5% by mass based on the total amount of the active energy ray curable composition. When the content of the polymerization inhibitor falls within the above ranges, hardness of the label peeling portion 30 increases, and the label peeling portion 30 that stands out as the convex portion is made easier to pinch with fingers when the label 10 is wound around an object such as a PET bottle container; furthermore, the label peeling portion 30 is made less likely to break during peeling the label, and the label tends to be made easy to peel as a result.

2.4. Filler

The active energy ray curable composition according to the present embodiment may include a filler. Although the filler is not particularly limited, examples thereof include inorganic fine particles and organic fine particles. One kind of the filler may be used alone, or two or more kinds thereof may be used in combination.

Although the inorganic fine particles are not particularly limited, examples thereof include fine particles of a metal compound such as titanium oxide, zinc oxide, cerium oxide, and calcium carbonate; and fine particles of a non-metal compound such as silica.

Although the organic fine particles are not particularly limited, examples thereof include cellulose nanofibers and carbon fibers.

When the active energy ray curable composition includes the filler, the filler preferably includes inorganic fine particles.

The content of the filler is preferably 0.05 to 10.0 parts by mass based on the total amount of the active energy ray curable composition. Furthermore, the content is preferably 0.1% to 5.0% by mass, more preferably 0.2% to 4.0% by mass, and still more preferably 0.3% to 3.0% by mass. The content is even further preferably 0.4% to 2.0% by mass, more preferably 0.4% to 1.0% by mass, and still more preferably 0.4% to 0.8% by mass.

When the filler is included, hardness of the label peeling portion 30 increases, and the label peeling portion 30 that stands out as the convex portion is made easier to pinch with fingers when the label 10 is wound around an object such as a PET bottle container; furthermore, the label peeling portion 30 is made less likely to break during peeling the label, and the label tends to be made easy to peel as a result. In addition, when the content of the filler falls within the above ranges, hardness of the label peeling portion 30 further increases, and the above effects tend to be more significant.

The primary particle diameter of the filler is preferably 100 nm or less and particularly preferably 50 nm or less from the viewpoint of improving transparency of the active energy ray curable composition. The primary particle diameter is more preferably 3 to 30 nm and further preferably 5 to 20 nm. The particle diameter can be a volume average particle diameter D50 measured by a dynamic light scattering method.

2.5. Coloring Material

The active energy ray curable composition may include a coloring material. Although the coloring material is not particularly limited, examples thereof include an inorganic pigment and an organic pigment. One kind of the coloring material may be used alone, or two or more kinds thereof may be used in combination.

The inorganic pigment includes carbon black (C.I. (Colour Index Generic Name) Pigment Black 7) species such as furnace black, lamp black, acetylene black, and channel black, iron oxide, and titanium oxide.

The organic pigment includes azo pigments such as an insoluble azo pigment, a condensed azo pigment, an azolake, and a chelate azo pigment; polycyclic pigments such as a phthalocyanine pigment, a perylene pigment and a perione pigment, an anthraquinone pigment, a quinacridone pigment, a dioxane pigment, a thioindigo pigment, an isoindolinone pigment, and a quinophthalone pigment; a chelate dye (for example, a basic chelate dye, an acidic chelate dye, etc.), a dye lake (for example, a basic dye lake, an acidic dye lake, etc.), a nitro pigment, a nitroso pigment, aniline black, and a daylight fluorescent pigment.

When the active energy ray curable composition includes the coloring material, the active energy ray curable composition preferably includes an inorganic pigment. When the active energy ray curable composition includes an inorganic pigment, hardness of the label peeling portion 30 increases, and the label peeling portion 30 that stands out as the convex portion is made easier to pinch with fingers when the label 10 is wound around an object such as a PET bottle container; furthermore, the label peeling portion 30 is made less likely to break during peeling the label, and the label tends to be made easy to peel as a result.

The particle diameter of the coloring material is preferably 50 nm or more, more preferably 60 to 400 nm, still more preferably 80 to 350 nm, further preferably 100 to 300 nm, and especially preferably 150 to 300 nm.

When the active energy ray curable composition includes the coloring material, the active energy ray curable composition may be a colored composition. In this case, the content of the coloring material is preferably 25% by mass or less, 20% by mass or less, or 10% to 15% by mass based on the total amount of the active energy ray curable composition. Alternatively, the content is preferably 0.5% to 10% by mass, more preferably 1% to 5% by mass, and still more preferably 1% to 4% by mass.

The inorganic pigment and the organic pigment as the coloring material make an ink into an ink (coloring ink) used to color a recording medium with the ink. On the other hand, the inorganic fine particles as the filler do not make an ink into a coloring ink. Accordingly, the clear composition described later may be an ink including the filler. Incidentally, a coloring ink may include the filler in addition to the coloring material.

When the content of the coloring material falls within the above ranges, hardness of the label peeling portion 30 increases, and the label peeling portion 30 that stands out as the convex portion is made easier to pinch with fingers when the label 10 is wound around an object such as a PET bottle container; furthermore, the label peeling portion 30 is made less likely to break during peeling the label, and the label tends to be made easy to peel as a result. In addition, visibility of the label peeling portion 30 is excellent, and the label peeling portion 30 is easily confirmed, which is preferable.

The active energy ray curable composition may be a clear composition. Note that the "clear composition" is not an ink used to color a recording medium and may be clear since the composition does not include the coloring material to the extent that the ink functions as a coloring ink. From this viewpoint, the content of the coloring material included in the clear composition is preferably 0.5% by mass or less, 0.3% by mass or less, or 0.1% by mass or less based on the total amount of the composition. Furthermore, the content is 0.05% by mass or less. The coloring material may not be included. When the active energy ray curable composition is a clear composition and does not include the coloring material to the extent that the composition functions as a coloring ink, the color of the label peeling portion 30 becomes less obtrusive, and designability of the label can be improved.

2.6. Other Additives

The active energy ray curable composition according to the present embodiment may contain an additive (component) other than those described above. Although such a component is not particularly limited, examples thereof may include heretofore known additives such as a dispersant, a polymerization accelerator, a penetration enhancer, and a lubricant (moisturizing agent) as well as other additives. Examples of the other additives include heretofore known additives such as a fixing agent, a mildew-proofing agent, an antiseptic agent, an antioxidant, an ultraviolet absorber, a chelating agent, and a thickening agent.

3. Active Energy Ray Curable Composition for Image

The active energy ray curable composition for an image according to the present embodiment includes a polymerizable compound including a monofunctional monomer and a polyfunctional monomer. The active energy ray curable composition for an image herein is a composition cured through irradiation with active energy rays and is a composition used to form a display image 60.

A composition of the active energy ray curable composition for an image may be a coloring ink in which a coloring material is added to a composition of the active energy ray curable composition for forming a label peeling portion described above. Provided that, the composition of the active energy ray curable composition for an image is preferably a composition described below. The composition of the active energy ray curable composition for an image described in detail below and the composition of the active energy ray curable composition for forming a label peeling portion may be different from each other. This case is preferable because the respective compositions of the active energy ray curable composition for an image and of the active energy ray curable composition for forming a label peeling portion can be made suitable for the respective functions.

Although the active energy rays are not particularly limited, examples thereof include ultraviolet rays, X rays, gamma rays, and electron beams. The active energy rays are preferably ultraviolet rays from the viewpoint that an ultraviolet source is easily available and widely used and from the viewpoint that a material suitable for curing with ultraviolet radiation is easily available and widely used.

Although the ultraviolet source is not particularly limited, examples thereof include a mercury lamp, a high-pressure mercury lamp, a UV-LED, a xenon lamp, and a laser light source.

Hereinafter, the composition of the active energy ray curable composition for an image according to the present embodiment will be described in detailed.

3.1. Polymerizable Compound

The polymerizable compound includes a monofunctional monomer having one polymerizable functional group and a polyfunctional monomer having multiple polymerizable functional groups. One kind of the polymerizable compound may be used alone, or two or more kinds thereof may be used in combination.

3.1.1. Monofunctional Monomer

Although the monofunctional monomer of the present embodiment is not particularly limited, examples thereof include a nitrogen-containing monofunctional monomer, a monofunctional acrylate having a polycyclic hydrocarbon group, and an aromatic group-containing monofunctional monomer. One kind of the monofunctional monomer may be used alone, or two or more kinds thereof may be used in combination.

Although the kind of the monofunctional monomer is not particularly limited, examples thereof are same as those exemplified for the active energy ray curable composition for forming a label peeling portion.

The content of the monofunctional monomer is preferably more than 40% by mass, more than 40% by mass and 90% by mass or less, 50% to 80% by mass, or 60% to 80% by mass based on the total amount of the polymerizable compound. When the content of the monofunctional monomer falls within the above ranges, the display image 60 formed by curing the active energy ray curable composition for an image has flexibility and thus tends to easily follow a film and hardly crack.

The content of the monofunctional monomer is preferably 30% to 90% by mass, 50% to 85% by mass, or 60% to 80% by mass based on the total amount of the active energy ray curable composition. When the content of the monofunctional monomer falls within the above ranges, the display image 60 formed by curing the active energy ray curable composition for an image has flexibility and thus tends to easily follow a film and hardly crack.

3.1.2. Polyfunctional Monomer

Although the polyfunctional monomer of the present embodiment is not particularly limited, examples thereof include a vinyl ether group-containing (meth)acrylate and a bifunctional (meth)acrylate.

Although the kind of the polyfunctional monomer is not particularly limited, examples thereof are same as those exemplified for the active energy ray curable composition for forming a label peeling portion.

The content of the polyfunctional monomer is preferably 60% by mass or less, 10% to 60% by mass, 20% to 50% by mass, or 20% to 40% by mass based on the total amount of the polymerizable compound. When the content of the polyfunctional monomer falls within the above ranges, the display image 60 formed by curing the active energy ray curable composition for an image has flexibility and thus tends to easily follow a film and hardly crack.

The content of the polyfunctional monomer is preferably 1% to 30% by mass, 1% to 20% by mass, 3% to 15% by mass, or 5% to 10% by mass based on the total amount of the active energy ray curable composition. When the content of the monofunctional monomer falls within the above ranges, the display image 60 formed by curing the active energy ray curable composition for an image has flexibility and thus tends to easily follow a film and hardly crack.

3.2. Polymerization Initiator

The active energy ray curable composition for an image according to the present embodiment preferably contains a polymerization initiator generating an active species through irradiation with active energy rays. One kind of the polymerization initiator may be used alone, or two or more kinds thereof may be used in combination.

Although the polymerization initiator is not particularly limited, examples thereof are same as those exemplified for the active energy ray curable composition for forming a label peeling portion. A sensitizer such as 2,4-diethyl thioxanthone may be used in combination with the polymerization initiator.

The content of the polymerization initiator is preferably 5% to 20% by mass, 7.5% to 17.5% by mass, or 10% to 15% by mass based on the total amount of the active energy ray curable composition. When the content of the polymerization initiator falls within the above ranges, the display image 60 formed by curing the active energy ray curable composition for an image has flexibility and thus tends to easily follow a film and hardly crack.

3.3. Polymerization Inhibitor

The active energy ray curable composition for an image according to the present embodiment may include a polymerization inhibitor. One kind of the polymerization inhibitor may be used alone, or two or more kinds thereof may be used in combination.

Although the polymerization inhibitor is not particularly limited, examples thereof are same as those exemplified for the active energy ray curable composition for forming a label peeling portion.

The content of the polymerization inhibitor is preferably 0.1% to 1.0% by mass or 0.1% to 0.5% by mass based on the total amount of the active energy ray curable composition. When the content of the polymerization inhibitor falls within the above ranges, the display image 60 formed by curing the active energy ray curable composition for an image has flexibility and thus tends to easily follow a film and hardly crack.

3.4. Coloring Material

The active energy ray curable composition for an image may include a coloring material. Although the coloring material is not particularly limited, examples thereof include an inorganic pigment and an organic pigment. One kind of the coloring material may be used alone, or two or more kinds thereof may be used in combination.

Although the kind of the coloring material is not particularly limited, examples thereof are same as those exemplified for the active energy ray curable composition for forming a label peeling portion.

The content of the coloring material is not particularly limited but is 20% by mass or less, 10% by mass or less, or 5% by mass or less based on the total amount of the active energy ray curable composition for an image, for example.

3.5. Other Additives

The active energy ray curable composition for an image according to the present embodiment may contain an additive (component) other than those described above. Although such a component is not particularly limited, examples thereof may include heretofore known additives such as a dispersant, a polymerization accelerator, a penetration enhancer, and a lubricant (moisturizing agent) as well as other additives. Examples of the other additives include heretofore known additives such as a fixing agent, a mildew-proofing agent, an antiseptic agent, an antioxidant, an ultraviolet absorber, a chelating agent, and a thickening agent.

4. Label

The label of the present embodiment has a base material 20 and a label peeling portion 30 formed on the base material 20, and the label peeling portion 30 is formed 10 μm or more higher than surroundings. The label of the present embodiment may be produced by the label production method of the present embodiment.

The shape of the label 10 is not limited to a rectangular shape as illustrated in FIG. 1A and may be a rectangular shape, a trapezoidal shape, a quadrangular shape, an elliptical shape, a triangular shape, or other polygonal shapes, for example.

Although a material for the base material is not particularly limited, examples thereof include plastic such as polyvinyl chloride, polyethylene terephthalate, polypropylene, polyethylene, polycarbonate, cellulose diacetate, cellulose triacetate, cellulose propionate, cellulose butyrate, cellulose acetate butyrate, nitrocellulose, polyolefin, polystyrene, and polyvinyl acetal, those obtained by processing surfaces of such plastic, glass, paper, metal, and wood. Among them, polyvinyl chloride, polystyrene, polyethylene terephthalate, polyethylene, polypropylene, and polyolefin are preferable, and polyethylene terephthalate is preferable.

In addition, the base material is preferably a shrink film. The shrink film may be a monoaxially stretched film or a biaxially stretched film. The base material can be shrunk upon heating and can be preferably used as a shrink film when packing a container such as a PET bottle.

Although the form of the base material is not particularly limited, examples thereof include a film, a board, and fabric. Among them, a film can be preferably used for a container such as a PET bottle and thus is preferable.

When the label 10 is wound around an object such as a PET bottle container, although not particularly limited to the following, the label 10 is wound around the periphery of the object in the X-axis direction, for example.

The shape of the object such as a PET bottle container is not particularly limited but is a cylindrical shape or a polygonal tubular shape such as a square tubular shape, for example. The shape of the upper surface and the shape of the lower surface of the object may be different from each other. In this case, the label can be made in close contact with the object when using a shrink film, which is preferable.

5. Recording Device

Figure 5:
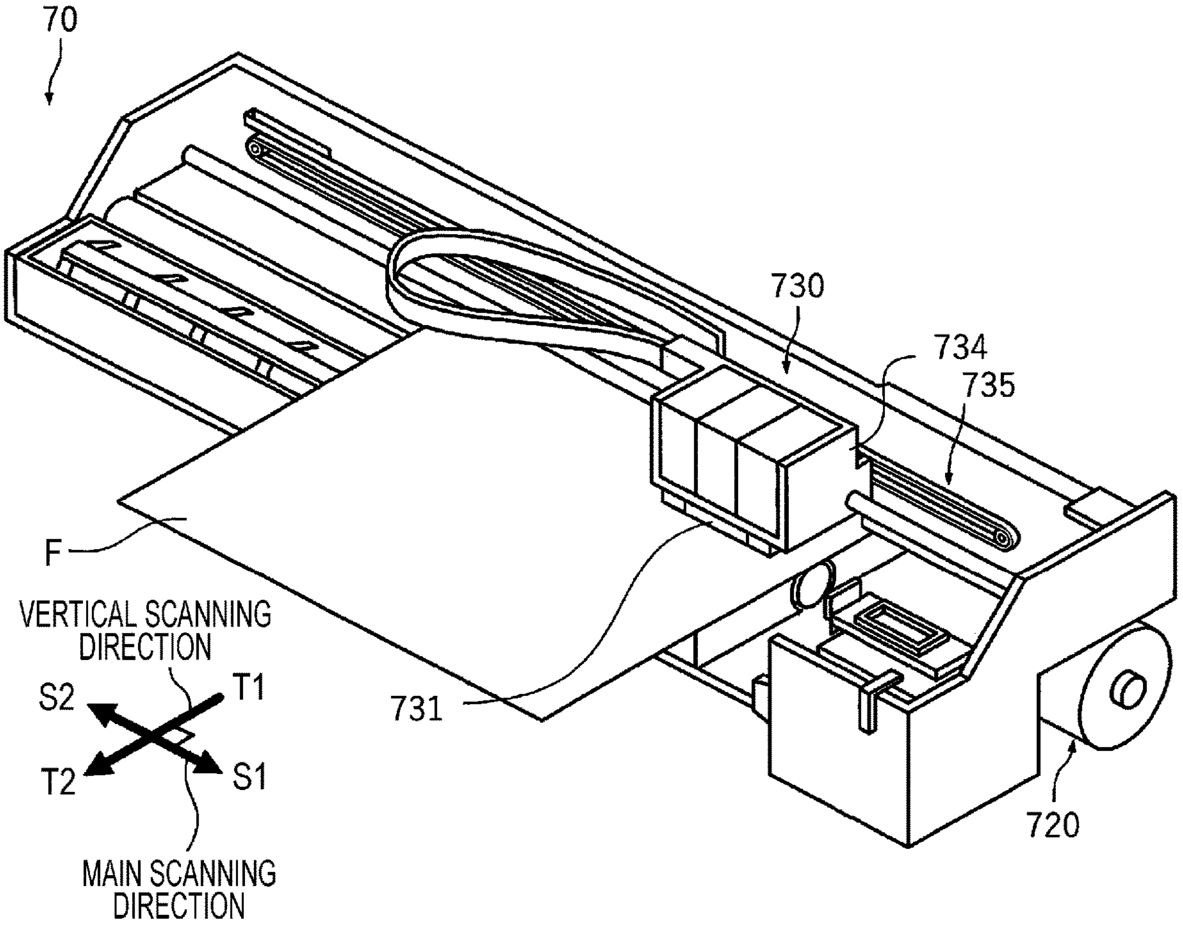
FIG. 5 is a diagram illustrating one example of a recording device used in the present embodiment.

An ink jet device can be used as a device for forming the label peeling portion and the display image of the present embodiment. A perspective view of a serial printer is illustrated in FIG. 5 as an example of the ink jet device. As illustrated in FIG. 5, the serial printer 70 includes a transporter 720 and a recorder 730. The transporter 720 transports a base material F supplied to the serial printer to the recorder 730, and the base material after recording is discharged to the outside of the serial printer. Specifically, the transporter 720 has feeding rollers and transports the fed base material F in the vertical scanning direction T2.

The recorder 730 includes: a carriage 734 to which an ink jet head 731 having a nozzle for discharging, to the base material F fed from the transporter 720, the active energy ray curable composition and the active energy ray curable composition for an image is mounted; and a carriage moving mechanism 735 for moving the carriage 734 in the main scanning direction S1, S2 of the recording medium F.

In a case of the serial printer, a head having a length smaller than the width of the base material is provided as the ink jet head 731, the head moves, and recording is carried out with a plurality of paths. In addition, the head 731 is mounted to the carriage 734 moving in a predetermined direction in the serial printer, and the active energy ray curable composition and the active energy ray curable composition for an image are discharged onto the base material F as the head moves with movement of the carriage. Recording is thus carried out with two or more paths. Incidentally, the path is also referred to as main scanning. Vertical scanning transporting the base material is carried out between paths. That is, main scanning and vertical scanning are alternatively carried out.

In addition, the ink jet device of the present embodiment is not limited to this serial-type printer and may be a line-type printer described above. The line-type printer is a printer carrying out recording on a base material through scanning once, using a line head which is an ink jet head having a length equal to or larger than the recording width of the base material.

Examples

Hereinafter, the present disclosure will be more specifically described using Examples and Comparative Examples. The present disclosure is not limited to the following examples.

1. Preparation of Active Energy Ray Curable Compositions and Active Energy Ray Curable Composition for Image Respective components were put into a mixture tank to achieve each of the compositions shown in Tables 1 and 2, followed by mixing, stirring, and subsequent filtering with a membrane filter to obtain an active energy ray curable composition and an active energy ray curable composition for an image for each of Examples and Comparative Examples. Incidentally, the numerical values for the respective components shown in the tables for each example are represented by mass % unless otherwise stated. In addition, the contents (mass %) of the coloring materials in Table 1 are solid concentrations.

TABLE 1

| Composition | Active energy ray curable composition | CL1 | CL2 | CL3 | CL4 | W1 | W2 |
|---|---|---|---|---|---|---|---|
| Monofunctional monomer | PEA | 20 | 20 | 22 | 21 | 33 | 17 |
| | ACMO | 5 | 9 | 18.5 | 5 | 10.5 | 8 |
| | IBXA | 5 | 9 | 10 | 5 | 18 | 0 |
| Polyfunctional monomer | VEEA | 30 | 27 | 20 | 30 | 6 | 25 |
| | DPGDA | 25.5 | 20.5 | 15 | 24 | 3 | 20.5 |
| Initiator | Irgacure819 | 6 | 6 | 6 | 6 | 6 | 6 |
| | TPO | 4.3 | 4.3 | 4.3 | 4.3 | 4.3 | 4.3 |
| | DETX | 4 | 4 | 4 | 4 | 4 | 4 |
| Polymerization inhibitor | MEHQ | 0.2 | 0.2 | 0.2 | 0.2 | 0.2 | 0.2 |
| Inorganic particles | Silica | 0 | 0 | 0 | 0.5 | 0 | 0 |
| Coloring material | Pigment Black 7 | 0 | 0 | 0 | 0 | 0 | 0 |
| | $TiO_2$ pigment | 0 | 0 | 0 | 0 | 15 | 15 |
| Total | | 100 | 100 | 100 | 100 | 100 | 100 |
| Ratio of monofunctional monomers in all monomers | | 0.35 | 0.44 | 0.59 | 0.36 | 0.87 | 0.35 |

CL1 to CL4: Clear compositions which include no coloring material and thus are clear.
W1 and W2: Color compositions which include the TiO2 pigment and thus are white.

TABLE 2

| Composition | Active energy ray curable composition for image | Bk1 |
|---|---|---|
| Monofunctional monomer | PEA | 39.5 |
| | ACMO | 10.5 |
| | IBXA | 24 |
| Polyfunctional monomer | VEEA | 6 |
| | DPGDA | 3 |
| Initiator | Irgacure819 | 6 |
| | TPO | 4.3 |
| | DETX | 4 |
| Polymerization inhibitor | MEHQ | 0.2 |
| Inorganic particles | Silica | 0.5 |
| Coloring material | Pigment Black 7 | 2 |
| | $TiO_2$ pigment | 0 |
| Total | | 100 |
| Ratio of monofunctional monomers in all monomers | | 0.89 |

Abbreviations and components of products used in Tables 1 and 2 are as follows.

Monofunctional Monomer

PEA (phenoxyethyl acrylate, product name "Viscoat #192," manufactured by OSAKA ORGANIC CHEMICAL INDUSTRY LTD.)

ACMO (acryloylmorpholine, manufactured by KJ Chemicals Corporation)

IBXA (isobornyl acrylate, manufactured by OSAKA ORGANIC CHEMICAL INDUSTRY LTD.)

Polyfunctional Monomer

VEEA (2-(2-vinyloxyethoxy)ethyl acrylate, manufactured by NIPPON SHOKUBAI CO., LTD.); DPGDA (dipropylene glycol diacrylate, product name "SR508," manufactured by Sartomer Inc.)

Polymerization Initiator

Irgacure 819 (bis(2,4,6-trimethylbenzoyl)-phenylpohosphine oxide, manufactured by BASF SE)

TPO (2,4,6-trimethylbenzoyldiphenylpohosphine oxide, product name "IRGACURE TPO," manufactured by BASF SE)

DETX (2,4-diethyl thioxanthone, product name "speedcure DETX," manufactured by Lambson Ltd.)

Polymerization Inhibitor

MEHQ (hydroquinone monomethyl ether, product name "p-methoxyphenol," manufactured by KANTO CHEMICAL CO., INC.)

Filler (Inorganic Particles)

Silica (silica nanoparticles, average particle diameter: 15 nm, product name "QSG-10," manufactured by Shin-Etsu Chemical Co., Ltd.)

Coloring Material

Pigment Black 7

$TiO_2$ pigment (primary particle diameter: 300 nm)

2. Production and Installation of Label

The active energy ray curable compositions and the active energy ray curable composition for an image of Examples and Comparative Examples were each charged into a serial-type ink jet printer. Then, each active energy ray curable composition was attached onto a shrink film (glycol-modified polyethylene terephthalate, PET-G: 50 μm thick, manufactured by Bonset America Corporation) as a base material under the environment of 25 °C and relative humidity of 50%, followed by UV light irradiation to form a label peeling portion. The thicknesses of the label peeling portions are shown in Table 3. As shown in Table 3, ink layer CL1 having a thickness of 30 μm and ink layer W1 having a thickness of 30 μm were laminated in Example 9. In addition, no label peeling portion was formed in Comparative Examples 2 and 3.

Furthermore, as shown in Table 3, a display image was also formed in the path same as that for the label peeling portion in each of Examples 6 to 9 and Comparative Example 3. Specifically, the active energy ray curable composition (ink Bk1) for an image was attached to a shrink film as a base material, followed by UV light irradiation. The display image was formed throughout the label thereby. Then, each of the active energy ray curable compositions was attached to a predetermined position on the display image, followed by UV light irradiation to form a label peeling portion.

As described above, a shrink film having a rectangular shape with 90 mm width and 230 mm length was obtained. Tetrahydrofuran (THF) was applied, with a width of 5 mm, to the edge portion of one short side of this shrink film, and this edge portion was adhered and fixed to the edge portion of the other short side to obtain a cylindrical sleeve so that the printed surface was positioned inside.

Incidentally, the display image was formed by discharging the active energy ray curable composition for an image over the whole surface of the label so as to achieve a thickness of 10 μm to carry out printing. The label peeling portion was formed by continuously discharging the active energy ray curable composition to draw a straight line in the Y-axis direction from one end to the other end of the label with a width of 7 mm in the X-axis direction as illustrated in FIG. 4. Incidentally, each thickness was measured by a micrometer.

The above sleeve was fixed to an aluminum beverage can (cylindrical shape, height: 115 mm, diameter: 70 mm, outer periphery: 220 mm) with a capacity of 350 mL and shrieked through heating at 90 °C for two minutes in a thermostat bath, and the sleeve was made in close contact with the beverage can to form a label.

A cutting portion was formed by forming, with a cutter, two incisions with a length of 0.5 mm so as to contact the right and left ends of the label peeling portion present in the upper end in the label width direction of the label closely contacting the beverage can.

3. Evaluation on Ease of Peeling Label

With respect to the label closely contacting the beverage can, the center of the label peeling portion present in the upper end in the label width direction was pinched with fingers, pulled directly down, and peeled, and the ease of peeling the label at that time was evaluated.

Evaluation Criteria

A: The label can be peeled at once from the upper end to the lower end in the label width direction and can be separated from the beverage can.

B: The label tears at a position between 60 mm or more and less than 90 mm from the upper end, when the label was peeled from the upper end.

C: The label tears at a position between 30 mm or more and less than 60 mm from the upper end, when the label was peeled from the upper end.

D: The label tears at a position between 0 mm or more and less than 30 mm from the upper end, when the label was peeled from the upper end.

4. Evaluation Results

From the evaluation results of Table 2, it has been found that all of Examples 1 to 12 are excellent in ease of peeling the labels compared with Comparative Example 1 in which the thickness of the label peeling portion is less than 10 μm and Comparative Examples 2 and 3 in which no label peeling portion was provided.

What is claimed is:

1. A label production method comprising:

a label peeling portion forming step of attaching an active energy ray curable composition to a base material and curing the active energy ray curable composition to form a label peeling portion having a raised section surrounded by a surrounding section that are formed of the same material so as to be unitary with each other, wherein the surrounding section and the raised section each have a uniform thickness, and the raised section is formed 10 μm or more higher than the surrounding section in the label peeling portion forming step; and the base material is a shrink film.

2. The production method according to claim 1, further comprising:

a cutting portion forming step of forming, in the base material, a cutting portion for cutting the label.

3. The production method according to claim 2, wherein the cutting portion is a perforated line or an incision.

4. The production method according to claim 2, wherein the cutting portion is formed adjacently to the label peeling portion.

5. The production method according to claim 2, wherein a plurality of the cutting portions are formed with the label peeling portion interposed therebetween.

6. The production method according to claim 2, wherein the cutting portion is formed at least in an edge portion of the label in the cutting portion forming step.

7. The production method according to claim 1, wherein p1 the label peeling portion is formed at least in an edge portion of the label in the label peeling portion forming step.

8. The production method according to claim 1, wherein the label peeling portion is formed continuously from one end to another end of the label.

9. The production method according to claim 1, wherein the active energy ray curable composition has a filler and/or an inorganic pigment.

TABLE 3

| | Examples | | | | | | | | | | | | Comparative Examples | | |
|---|---|---|---|---|---|---|---|---|---|---|---|---|---|---|---|
| | 1 | 2 | 3 | 4 | 5 | 6 | 7 | 8 | 9 | 10 | 11 | 12 | 1 | 2 | 3 |
| Active energy ray curable composition | CL1 | CL1 | CL1 | CL2 | CL3 | CL1 | CL2 | W1 | CL1 W1 | CL4 | W1 | W2 | CL1 | | |
| Active energy ray curable composition for image | | | | | | Bk1 | Bk1 | Bk1 | Bk1 | | | | | | Bk1 |
| Height of label peeling portion (μm) | 30 | 20 | 10 | 30 | 30 | 30 | 30 | 30 | 60 | 20 | 30 | 20 | 8 | 0 | 0 |
| Ease of peeling label | A | B | B | B | C | A | B | B | A | A | B | A | D | D | D |

10. The production method according to claim 1, wherein the active energy ray curable composition is a clear composition.

11. The production method according to claim 1, wherein the active energy ray curable composition includes a monofunctional monomer, and a content of the monofunctional monomer is 40% by mass or less based on a total amount of a polymerizable compound included in the active energy ray curable composition.

12. The production method according to claim 1, wherein the active energy ray curable composition is discharged from an ink jet head to attach the active energy ray curable composition onto the base material in the label peeling portion forming step.

13. The production method according to claim 1, further comprising:

an image forming step of attaching, onto the base material, an active energy ray curable composition for an image, and curing the active energy ray curable composition for an image to form a display image, wherein the active energy ray curable composition for an image has a composition different from a composition of the active energy ray curable composition.

14. The production method according to claim 13, wherein the active energy ray curable composition for an image includes a monofunctional monomer, and a content of the monofunctional monomer exceeds 40% by mass based on a total amount of a polymerizable compound included in the active energy ray curable composition for an image.

15. The production method according to claim 1, further comprising:

a cutting out step of cutting out the label from the base material.

16. A label production method comprising:

a label peeling portion forming step of attaching an active energy ray curable composition to a base material and curing the active energy ray curable composition to form a label peeling portion having a raised section surrounded by a surrounding section that are formed of the same material so as to be unitary with each other, wherein the surrounding section and the raised section each have a uniform thickness, and the raised section is formed 10 μm or more higher than the surrounding section in the label peeling portion forming step, the active energy ray curable composition includes a coloring material, and the active energy ray curable composition is a colored composition.

* * * * *